United States Patent
Lu et al.

(10) Patent No.: US 11,585,107 B2
(45) Date of Patent: Feb. 21, 2023

(54) REBAR TYING MACHINE WIRE FEEDING DISC BRAKING MECHANISM WITH POSITIONING DEVICE

(71) Applicant: Taizhou Xindalu Electronic Technology Co., Ltd., Zhejiang (CN)

(72) Inventors: Fujun Lu, Zhejiang (CN); Shoufu Xie, Zhejiang (CN)

(73) Assignee: TAIZHOU XINDALU ELECTRONIC TECHNOLOGY CO., LTD., Zhejiang (CN)

( * ) Notice: Subject to any disclaimer, the term of this patent is extended or adjusted under 35 U.S.C. 154(b) by 324 days.

(21) Appl. No.: 16/756,398

(22) PCT Filed: Aug. 22, 2019

(86) PCT No.: PCT/CN2019/101978
§ 371 (c)(1),
(2) Date: Apr. 15, 2020

(87) PCT Pub. No.: WO2020/007378
PCT Pub. Date: Jan. 9, 2020

(65) Prior Publication Data
US 2020/0248468 A1    Aug. 6, 2020

(30) Foreign Application Priority Data
Jul. 5, 2018 (CN) .......................... 201821057871.7

(51) Int. Cl.
*B65B 13/22* (2006.01)
*E04G 21/12* (2006.01)
*F16D 65/14* (2006.01)

(52) U.S. Cl.
CPC ........... *E04G 21/123* (2013.01); *F16D 65/14* (2013.01)

(58) Field of Classification Search
CPC ....... B65B 13/28; B65B 13/285; E04G 21/12; E04G 21/122; E04G 21/123; F16D 65/14
(Continued)

(56) References Cited

U.S. PATENT DOCUMENTS 11,098,492 B2 *    8/2021  Machida ............... E04G 21/122
2017/0218631 A1 *  8/2017  Matsuno ............... E04G 21/123
(Continued)

FOREIGN PATENT DOCUMENTS

| CN | 203238962 U | 10/2013 |
| CN | 104870315 A | 8/2015 |

(Continued)

*Primary Examiner* — Christopher P Schwartz
(74) *Attorney, Agent, or Firm* — Muncy, Geissler, Olds & Lowe, P.C.

(57) ABSTRACT

A rebar tying machine wire feeding disc braking mechanism with positioning device has a braking part for stopping a wire feeding disc and a cam mechanism for controlling actions of the braking part. The cam mechanism has a cam and a push shaft mounted on a fixed seat, capable of axial displacement. One end of the push shaft presses against a rim of the cam and reciprocates along with the changing outline of the rim. A middle portion of the push shaft is a diameter-varying segment and presses against one end of the braking part such that the braking part swings forwards and backwards with the translation of the push shaft, the cam mechanism realizes stopping through the positioning device. The forward rotation inertia of the cam is eliminated such that the cam is stopped.

10 Claims, 8 Drawing Sheets

(58) Field of Classification Search
USPC .... 140/49, 57, 73, 74, 93 A, 93 R, 139, 149
See application file for complete search history.

(56) References Cited

U.S. PATENT DOCUMENTS

| | | | |
|---|---|---|---|
| 2019/0002139 A1* | 1/2019 | Itagaki | E04G 21/122 |
| 2019/0193879 A1* | 6/2019 | Yamamoto | B65B 13/285 |
| 2019/0194958 A1* | 6/2019 | Machida | E04G 21/123 |
| 2020/0156224 A1* | 5/2020 | Suenaga | B65B 13/285 |

FOREIGN PATENT DOCUMENTS

| | | |
|---|---|---|
| CN | 106639331 A | 5/2017 |
| CN | 208364642 U | 1/2019 |
| CN | 208397169 U | 1/2019 |
| JP | H11156746 A | 6/1999 |
| JP | 2016030625 A | 3/2016 |

* cited by examiner

REBAR TYING MACHINE WIRE FEEDING DISC BRAKING MECHANISM WITH POSITIONING DEVICE

FIELD OF THE INVENTION

The present invention belongs to the field of rebar tying machine equipment, in particular to a rebar tying machine wire feeding disc braking mechanism with a positioning device.

BACKGROUND OF THE INVENTION

The existing rebar tying machine is provided with a braking mechanism near the wire feeding disc, and when the feeding amount of steel wire reaches the set length, the braking mechanism acts to enable the wire feeding disc to stop rotating.

The braking unit of the wire feeding disc of the existing rebar tying machine comprises a braking part capable of enabling the wire feeding disc to stop rotating, the braking part is driven by a brake assembly, the brake assembly comprises a shaft which returns through a spring, a connecting rod connected to the other end of the shaft through a connecting wheel and a solenoid connected with the connecting rod through an iron core, and the connecting rod is rotatably connected to the iron core through a pin. When the solenoid is energized, the solenoid pulls the iron core and drives the connecting rod to swing around the pin, enabling the connecting wheel to drive the shaft to rotate and thus enabling the braking part to swing to catch the wire feeding disc, such that the wire feeding disc stops rotating; when the solenoid is de-energized, the braking part swings back to lift limiting of the wire feeding disc. The purpose of this action is to prevent the wire feeding disc from being unable to stop rotating in time due to inertia, causing the diameter of the steel wire coiled on the wire feeding disc to expand, which affects the next wire feeding. However, there is inertia when the connecting rod drives the shaft which in turn drives the brake disc to move, and the shaft is easily damaged.

SUMMARY OF THE INVENTION

In view of the problem that the existing braking unit has inertia and easily damages the shaft, the present invention provides a rebar tying machine wire feeding disc braking mechanism with a positioning device, in which a cam capable of accurate positioning is adopted to realize braking, such that inertia is eliminated and accurate positioning is realized.

The present invention adopts the following technical solution: a rebar tying machine wire feeding disc braking mechanism with a positioning device, comprising a braking part for stopping a wire feeding disc, wherein the rebar tying machine wire feeding disc braking mechanism with a positioning device further comprises a cam mechanism for controlling actions of the braking part, the cam mechanism comprises a cam and a push shaft mounted on a fixed seat and capable of axial displacement, one end of the push shaft presses against a rim of the cam and reciprocates along with the changing outline of the rim, a middle portion of the push shaft is a diameter-varying segment and presses against one end of the braking part such that the braking part swings forwards and backwards with the translation of the push shaft, the cam mechanism realizes stopping through the positioning device, the positioning device comprises a motor capable of forward and reverse rotation motion and a Hall sensing device for sending out a stop signal, the motor is used for controlling actions of the cam, the Hall sensing device sends out a stop signal when the cam rotates to an initial position; according to the stop signal, the motor stops and reversely rotates instantaneously to eliminate the forward rotation inertia of the cam such that the cam stops at the initial position.

The present invention adopts the cam mechanism to replace the link mechanism in the prior art, and enables the motion of the shaft to change from rotation to linear reciprocating motion, the action is relatively smooth, and it has effects of eliminating the inertia, preventing the shaft from being damaged, and preventing the service life of the shaft from being affected. The provided Hall sensing device enables the motor to accurately stop rotating and be reversely braked, guaranteeing the cam to stop at the set position after the cam completes the push action, and guaranteeing the accuracy of repetitive braking.

Further, the Hall sensing device comprises a magnetic part provided on the cam and a stationary Hall sensor, the magnetic part rotates with the cam, and the magnetic part enables the Hall sensor to generate the stop signal when the cam is in the initial position. The Hall sensor is a switching type Hall sensor. When the magnetic part is close to the Hall sensor, the Hall sensor senses the magnetic field of the magnetic part, and a trigger in the Hall sensor is triggered to generate the stop signal. The magnetic part and the Hall sensor can accurately cooperate to ensure the stopping effect.

Further, the Hall sensor is fixed on a connecting plate fixed between the motor and the cam. The Hall sensor is fixed on the connecting plate such that the Hall sensor is separated from other components. The arrangement of the Hall sensor has a larger spatial degree of freedom.

Further, the motor is a low-power motor. It has characteristics of large torque and small current, it is less likely to generate heat during instantaneous reverse braking, the stability is good and the requirements can be met.

The specific working process is as follows: when an operation trigger of the rebar tying machine is pulled, the wire feeding mechanism starts to feed the wire; when the feeding amount of the wire reaches the set value, the motor starts and drives the cam to rotate, such that the push shaft moves with the changing outline of the rim of the cam, causing the braking part to swing into the wire feeding disc to stop the wire feeding disc; the cam continues to rotate until the magnetic part makes the Hall sensor send out a stop signal, the motor stops and reversely rotates instantaneously to offset the rotation inertia of the cam and to keep the cam in the initial position waiting for the next working cycle.

Another preferred solution provides a rebar tying machine wire feeding disc braking mechanism with a positioning device comprising a braking part for stopping a wire feeding disc, wherein the rebar tying machine wire feeding disc braking mechanism with a positioning device further comprises a cam mechanism for controlling actions of the braking part, the cam mechanism comprises a cam driven by a motor and a push shaft mounted on a fixed seat and capable of axial displacement, one end of the push shaft presses against a rim of the cam and reciprocates along with the changing outline of the rim, a middle portion of the push shaft is a diameter-varying segment and presses against one end of the braking part such that the braking part swings forwards and backwards with the translation of the push shaft, the motor enables the cam to rotate for one turn at each time, the cam mechanism realizes stopping through the positioning device, the positioning device is an elastic part in close contact with the rim of the cam, a notch is provided in the rim of the cam, the elastic part and the notch realize limiting to eliminate the forward rotation inertia of the cam such that the cam stops at an initial position.

The present invention adopts the cam mechanism to replace the link mechanism in the prior art, and enables the motion of the shaft to change from rotation to linear reciprocating motion, the action is relatively smooth, and it has effects of eliminating the inertia, preventing the shaft from being damaged, and preventing the service life of the shaft from being affected. The provided elastic part and the notch realize limiting to eliminate the inertia of the cam, the cam stops, the cam is guaranteed to stop at the set position after the cam completes the push action, and the accuracy of repetitive braking is guaranteed; and the positioning device is a mechanical structure and is a more stable structure relative to the electrical control part, and the braking accuracy can be better guaranteed.

Further, the elastic part is an elastic piece, one end of the elastic piece is fixed, the other end is bent to form a bulge, the bulge is capable of sliding in close contact with the rim of the cam, and the cam stops rotating when the bulge is located in the notch. The elastic piece enables the bulge to be in close contact with the rim of the cam through its elasticity, and enables the bulge to be embedded into the notch and also be separated from the notch under the effect of the torsional force of the cam, such that it is not easily stuck.

Further, the elastic part is a hollow pipe with a built-in ball, one end of the hollow pipe is closed, a spring is provided between the ball and the closed end of the hollow pipe, the spring enables the ball to be in close contact with the rim of the cam, and when the ball is placed in the notch, the cam stops rotating. The ball rolls along the rim of the cam, it is subject to small friction and low forward resistance. When the ball moves to the notch, the motor has been powered off, the torsion force generated by the cam rotating under the inertia is small, the ball falls into the notch to eliminate the rotation inertia of the cam, the motor starts, the cam starts to rotate again, and the cam can push the ball away under the torsion force, such that the it is not easily stuck.

Further, the braking part is rotatably connected to the fixed seat through a pin, a torsion spring is sleeved on the pin, and the torsion spring is limited by the fixed seat and the braking part. The torsion spring can not only enable one end of the braking part to be in close contact with the push shaft, but also provide power for the braking part to swing outwards, and this facilitates continuous operation of the braking part.

Further, the push shaft consists of a first end, a diameter-varying segment and a second end, the first end presses against the rim of the cam, the diameter-varying segment is located within the fixed seat, and a compression spring is sleeved on the second end of the push shaft and is located between the fixed seat and the diameter-varying segment. The push shaft converts the rotation of the cam into translation, and converts the translation into the rotation of the braking part through the diameter-varying segment, the number of parts is effectively reduced and the situation of being stuck is avoided; the compression spring enables the first end of the push shaft to be in close contact with the rim of the cam, such that the push shaft can translate back and forth with the rotation of the cam.

Further, the two ends of the braking part are respectively a linkage end and a stop end located on upper and lower sides of the pin, the linkage end presses against the outer surface of the diameter-varying segment, and when the push shaft translates, the changing outline of the diameter-varying segment pushes the linkage end to move so that the stop end swings around the pin to clamp or leave a sidewall of the wire feeding disc, realizing limiting or releasing of the wire feeding disc. The diameter-varying segment pushes the linkage end to convert the translation of the push shaft into the rotation of the braking part, the linkage end and the stop end are located on the two sides of the pin, and thus it is more labor-saving to push the linkage end.

The specific working process is as follows: when the operation trigger of the rebar tying machine is pulled, the wire feeding mechanism starts to feed the wire; when the feeding amount of the wire reaches the set value, the motor starts and drives the cam to rotate, such that the push shaft moves along with the outline surface of the cam, enabling the braking part to swing to brake the wire feeding disc; the cam continues to rotate until the elastic piece or the ball is limited by the notch of the cam so as to offset the rotation inertia of the cam and to keep the cam in the initial position waiting for the next working cycle.

Compared with the prior art, the present invention has the following beneficial effects: since the present invention adopts the cam mechanism, the motion of the shaft is changed from rotation to linear reciprocating motion, the action is smooth, and it has effects of eliminating the inertia, preventing the shaft from being damaged and preventing the service life of the shaft from being affected; since the positioning device is adopted to eliminate the inertia of the cam, the cam is guaranteed to stop at the set position after the cam completes the push action, and the accuracy of repetitive braking is guaranteed.

In the drawings, 1—wire feeding disc; 2—braking part; 21—linkage end; 22—stop end; 23—pin; 231—torsion spring; 3—motor; 4—cam; 41—magnetic part; 42—notch; 5—push shaft; 51—first end; 52—second end; 53—diameter-varying segment; 54—compression spring; 6—fixed seat; 7—Hall sensor; 8—elastic piece; 81—bulge; 9—hollow pipe; 10—ball; 11—spring, 12—connecting plate.

DESCRIPTION OF THE EMBODIMENTS

The technical solutions of the embodiments of the present invention will be explained and described below with reference to the drawings of the present invention. However, the following embodiments are only preferred embodiments of the present invention, not all of them. Other embodiments obtained by one skilled in the art based on the embodiments in the detailed description without contributing any creative labor belong to the protection scope of the present invention.

Embodiment 1

As illustrated in FIG. 1 to FIG. 4, a rebar tying machine wire feeding disc braking mechanism with a positioning device provided by the embodiment comprises a braking part 2 for stopping a wire feeding disc 1, and further comprises a cam mechanism for controlling actions of the braking part 2, the cam mechanism comprises a cam 4 and a push shaft 5 mounted on a fixed seat 6 and capable of axial displacement, one end of the push shaft 5 presses against a rim of the cam 4 and reciprocates along with the changing outline of the rim, a middle portion of the push shaft 5 is a diameter-varying segment 53 and presses against one end of the braking part 2 such that the braking part 2 swings forwards and backwards with the translation of the push shaft 5, the cam mechanism realizes stopping through the positioning device, the positioning device comprises a motor 3 capable of forward and reverse rotation motion and a Hall sensing device for sending out a stop signal, the motor 3 is used for controlling actions of the cam 4, the Hall sensing device sends out a stop signal when the cam 4 rotates to an initial position; according to the stop signal, the motor 3 stops and reversely rotates instantaneously to eliminate the forward rotation inertia of the cam 4 such that the cam 4 stops at the initial position.

The present invention adopts the accurately positioned cam 4 to realize braking, which can not only eliminate the damage caused by inertia, but also realize accurate positioning, so as to ensure accurate braking during repetitive braking.

Figure 1:
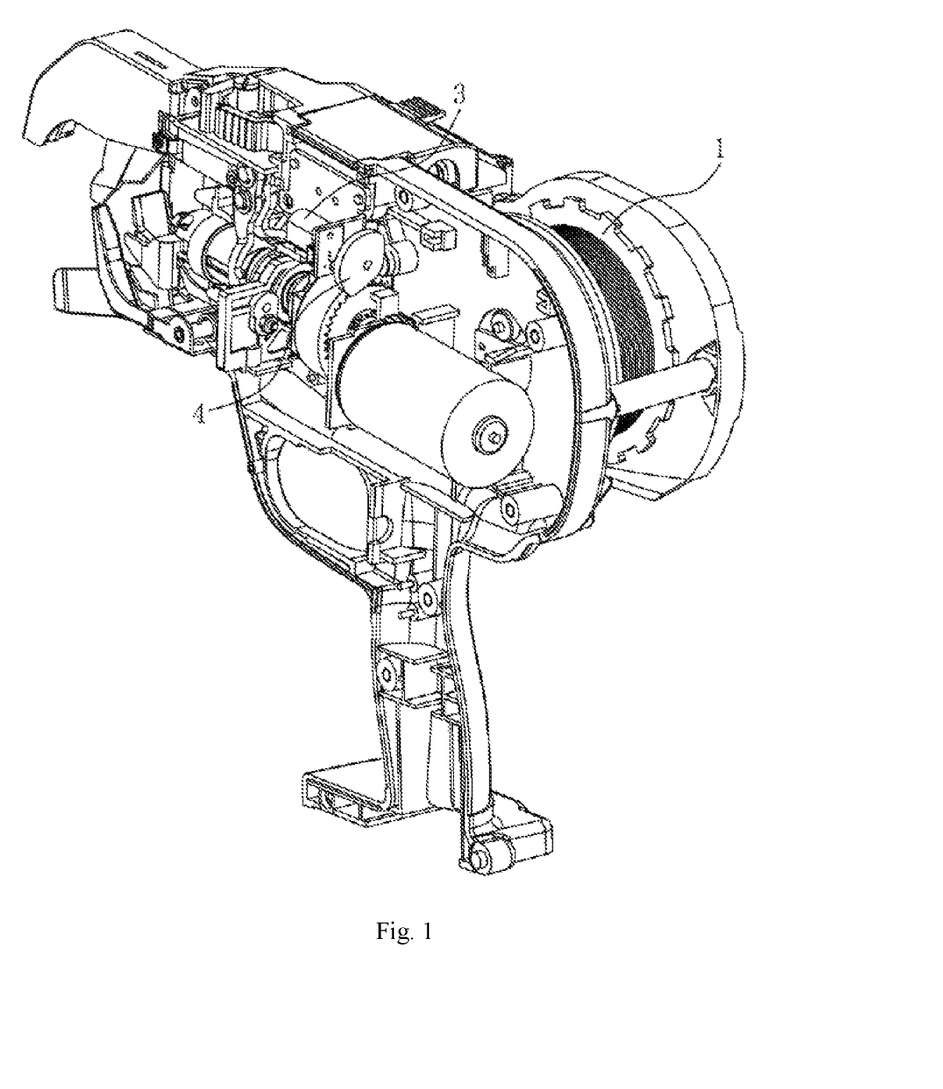
FIG. 1 illustrates a structural schematic view of a rebar tying machine.
Figure 2:
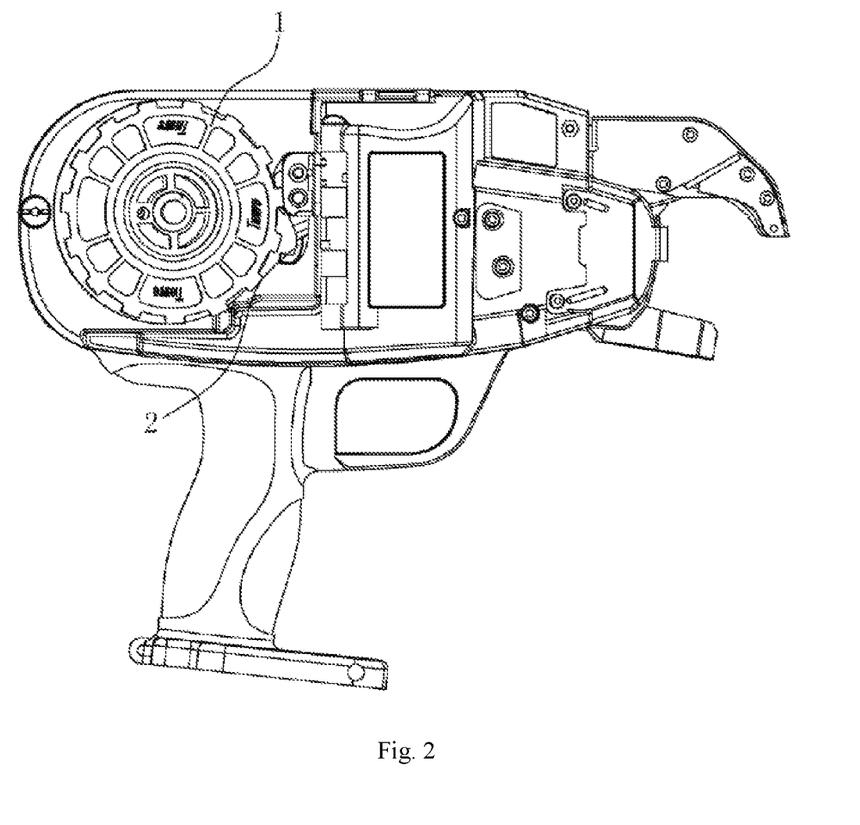
FIG. 2 illustrates a structural schematic view of the rebar tying machine in another direction.
Figure 3:
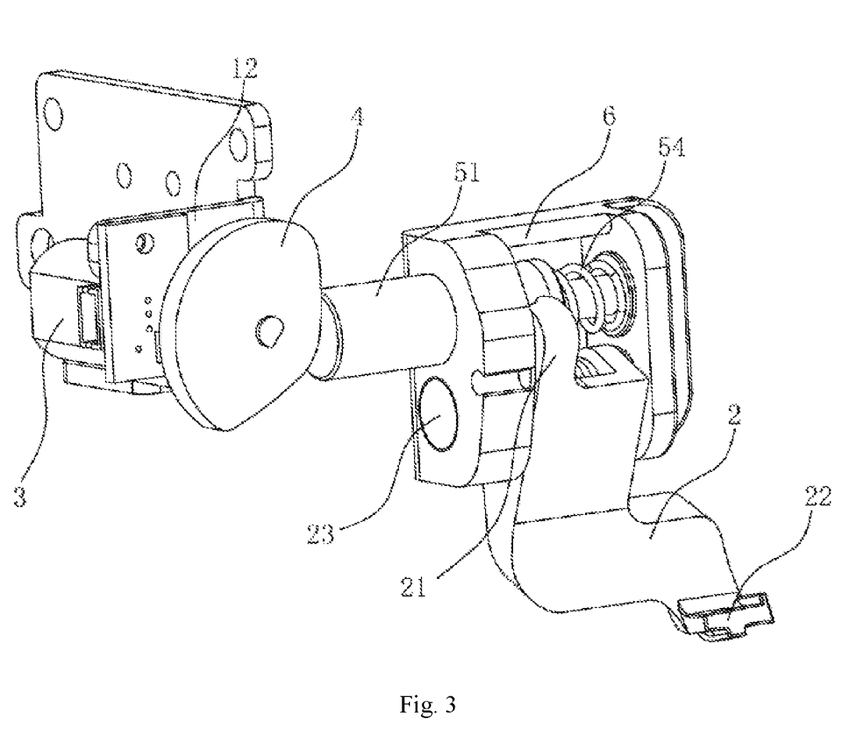
FIG. 3 illustrates a structural schematic view of a rebar tying machine wire feeding disc braking mechanism according to embodiment 1.
Figure 4:
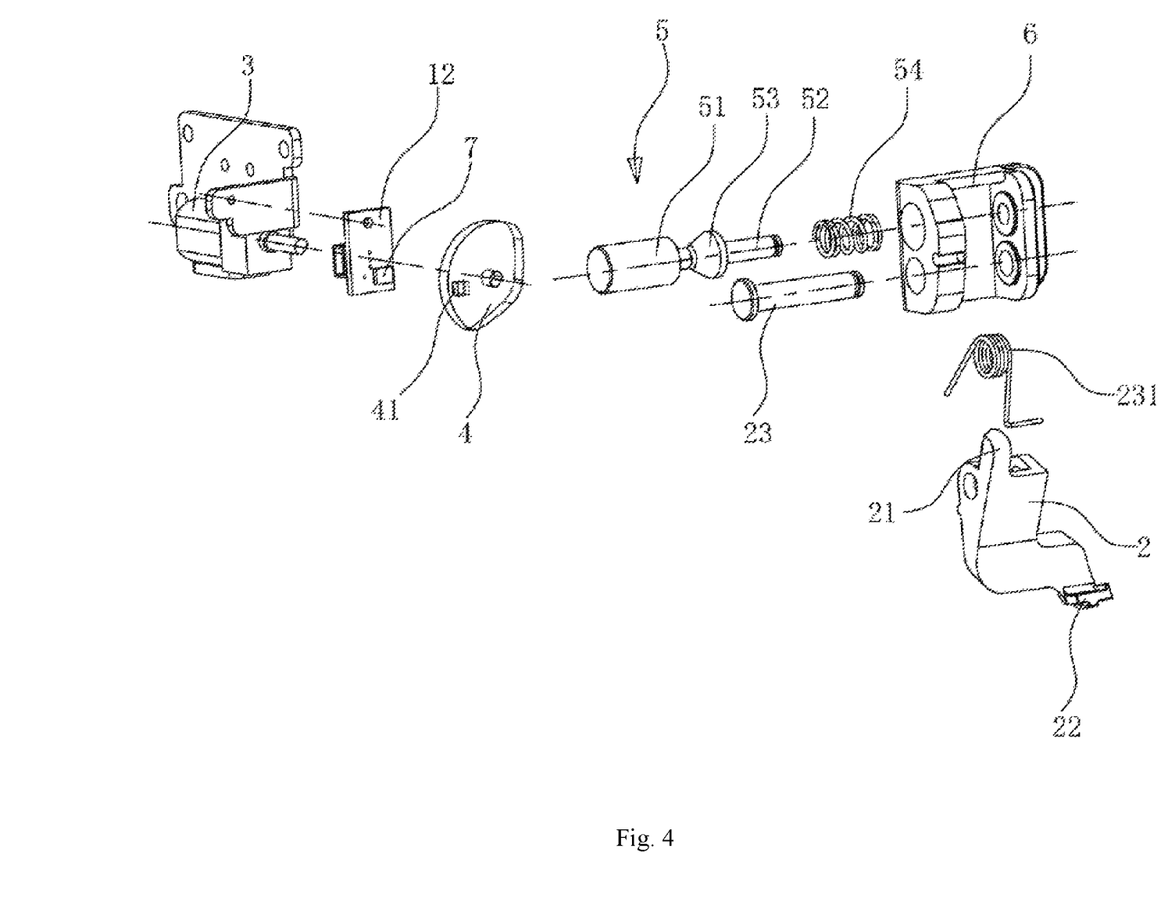
FIG. 4 illustrates an assembly structure schematic view of a rebar tying machine wire feeding disc braking mechanism according to embodiment 1.

The Hall sensing device comprises a magnetic part 41 provided on the cam 4 and a stationary Hall sensor 7, the magnetic part 41 rotates along with the cam 4, and when the cam 4 is in the initial position, the magnetic part 41 enables the Hall sensor 7 to generate the stop signal. The Hall sensor 7 is a switching type Hall sensor. When the magnetic part 41 is close to the Hall sensor 7, the Hall sensor 7 senses the magnetic field of the magnetic part 41, and a trigger in the Hall sensor 7 is triggered to generate the stop signal. The magnetic part 41 and the Hall sensor 7 can accurately cooperate to ensure the stopping effect.

The Hall sensor 7 is fixed on a connecting plate 12 fixed between the motor 3 and the cam 4. The Hall sensor 7 being fixed on the connecting plate 12 enables the Hall sensor 7 to be separated from other components. The arrangement of the Hall sensor 7 has a large spatial degree of freedom.

The motor 3 is a low-power motor. It has the characteristics of large torque and small current, it is less likely to generate heat during instantaneous reverse braking, the stability is better and the requirements can be met.

The braking part 2 is rotatably connected to the fixed seat 6 through a pin 23, a torsion spring 231 for restoring the braking part 2 is sleeved on the pin 23, and the torsion spring 231 is limited by the fixed seat 6 and the braking part 2. The torsion spring 231 can not only enable one end of the braking part 2 to be in close contact with the push shaft 5, but also provide power for the braking part 2 to swing outwards, and this facilitates the continuous operation of the braking part 2.

The push shaft 5 consists of a first end 51, a diameter-varying segment 53 and a second end 52, the first end 51 presses against the rim of the cam 4, the diameter-varying segment 53 is located within the fixed seat 6, and a compression spring 54 is sleeved on the second end 52 of the push shaft 5 and is located between the fixed seat 6 and the diameter-varying segment 53. The push shaft 5 converts the rotation of the cam 4 into translation, and converts the translation into the rotation of the braking part 2 through the diameter-varying segment 53, the number of parts is effectively reduced and the situation of being stuck is avoided; the compression spring 54 enables the first end 51 of the push shaft 5 to be in close contact with the rim of the cam 4, such that the push shaft 5 can translate back and forth with the rotation of the cam 4.

The two ends of the braking part 2 are respectively a linkage end 21 and a stop end 22 located on upper and lower sides of the pin 23, the linkage end 21 presses against an outer surface of the diameter-varying segment 53, and when the push shaft 5 translates, the changing outline of the diameter-varying segment 53 pushes the linkage end 21 to move so that the stop end 22 swings around the pin 23 to clamp or leave a sidewall of the wire feeding disc 1, realizing limiting or releasing of the wire feeding disc 1. The diameter-varying segment 53 pushes the linkage end 21 to convert the translation of the push shaft 5 into the rotation of the braking part 2, the linkage end 21 and the stop end 22 are located on the two sides of the pin 23, and thus it is more labor-saving to push the linkage end 21.

The specific working process is as follows: when an operation trigger of the rebar tying machine is pulled, the wire feeding mechanism starts to feed the wire; when the feeding amount of the wire reaches a set value, the motor 3 starts and drives the cam 4 to rotate, such that the push shaft 5 moves with the changing outline of the rim of the cam 4, pushing the braking part 2 to swing into the wire feeding disc 1 to stop the wire feeding disc 1; the cam 4 continues to rotate until the magnetic part 41 makes the Hall sensor 7 send out a stop signal, at this point, the motor 3 stops and reversely rotates instantaneously to offset the rotation inertia of the cam 4, so as to keep the cam 4 in the initial position waiting for the next working cycle.

Embodiment 2

Figure 5:
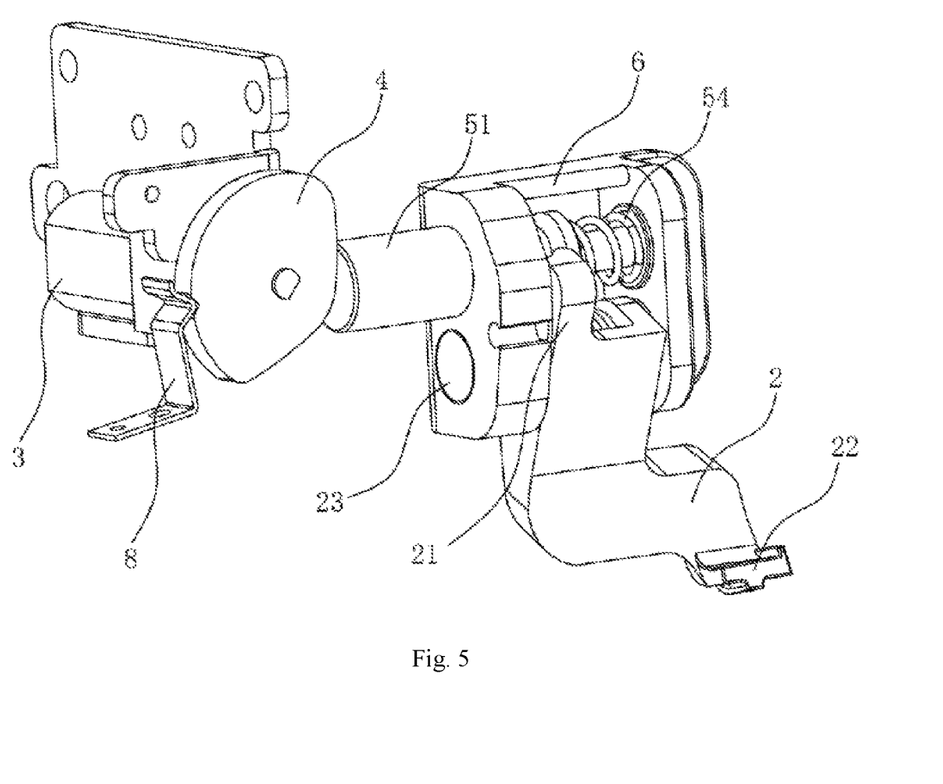
FIG. 5 illustrates a structural schematic view of a rebar tying machine wire feeding disc braking mechanism according to embodiment 2.
Figure 6:
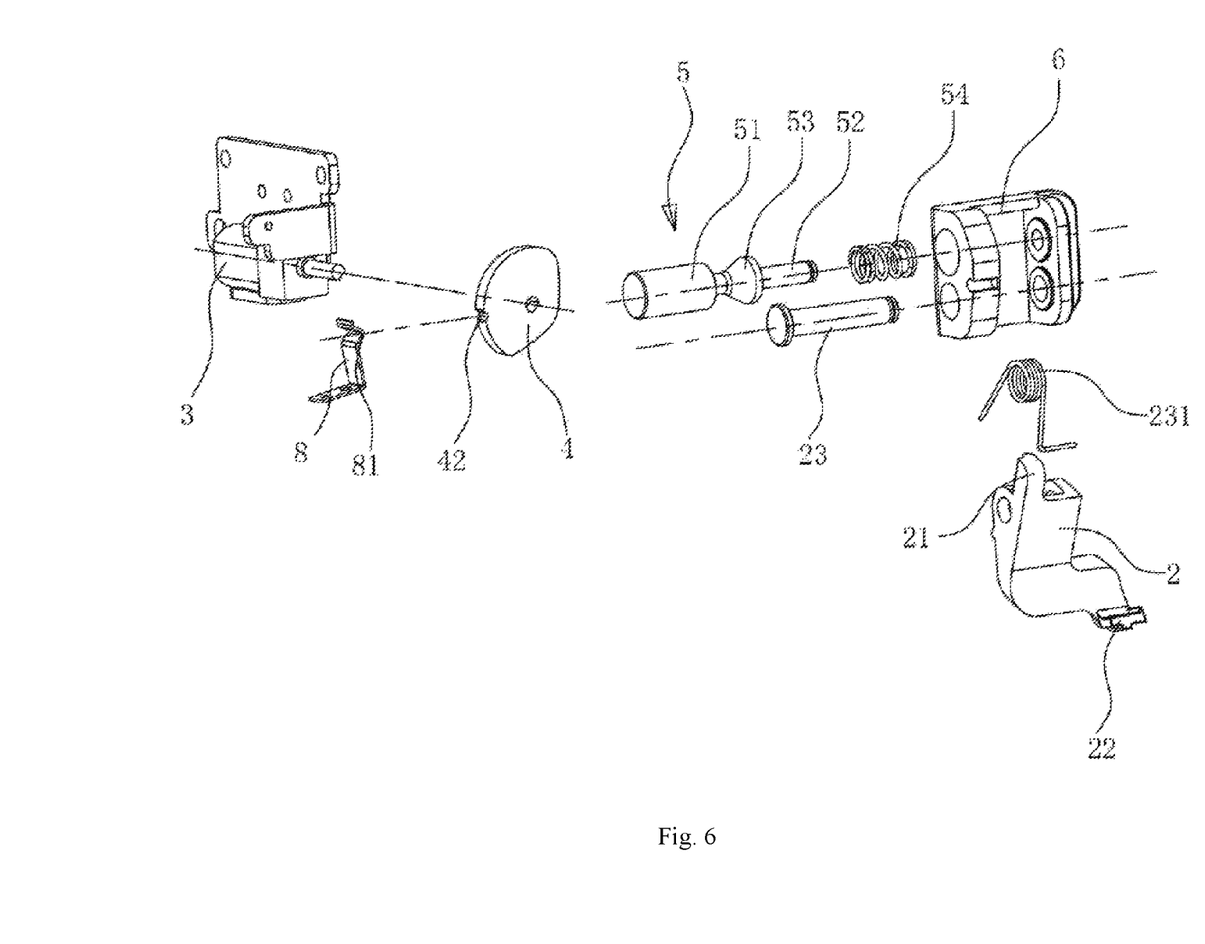
FIG. 6 illustrates an assembly structure schematic view of a rebar tying machine wire feeding disc braking mechanism according to embodiment 2.

As illustrated in FIG. 5 and FIG. 6, a rebar tying machine wire feeding disc braking mechanism with a positioning device provided by the embodiment comprises a braking part 2 for stopping a wire feeding disc 1, and further comprises a cam mechanism for controlling actions of the braking part 2, the cam mechanism comprises a cam 4 driven by a motor 3 and a push shaft 5 mounted on a fixed seat 6 and capable of axial displacement, one end of the push shaft 5 presses against a rim of the cam 4 and reciprocates along with the changing outline of the rim, a middle portion of the push shaft 5 is a diameter-varying segment 53 and presses against one end of the braking part 2 such that the braking part 2 swings forwards and backwards with the translation of the push shaft 5, the motor 3 enables the cam 4 to rotate for one turn at each time, a notch 42 is provided in the rim of the cam 4, the cam mechanism realizes stopping through an elastic piece 8, one end of the elastic piece 8 is fixed, the other end is bent to form a bulge 81, the bulge 81 is capable of sliding in close contact with the rim of the cam 4, and when the bulge 81 is located in the notch 42, the forward rotation inertia of the cam 4 is eliminated, and the cam 4 stops rotating and stops at the initial position.

When the cam 4 is located at the initial position, the elastic piece 8 and the notch realize limiting; when the motor 3 starts, the elastic piece 8 moves in close contact with the rim of the cam 4; when the motor 3 rotates for one turn and stops, the cam 4 still has inertia at this moment; after the bulge 81 of the elastic piece 8 is placed in the notch 42 and eliminates the inertia of the cam 4, the cam 4 stops, the cam 4 is guaranteed to be positioned accurately, and the braking accuracy during repetitive braking is guaranteed; and the positioning device is a mechanical structure and has a more stable structure relative to an electrical control part, and the braking accuracy can be better guaranteed.

The braking part 2 is rotatably connected to the fixed seat 6 through a pin 23, a torsion spring 231 for restoring the braking part 2 is sleeved on the pin 23, and the torsion spring 231 is limited by the fixed seat 6 and the braking part 2. The torsion spring 231 can not only enable one end of the braking part 2 to be in close contact with the push shaft 5, but also restore the braking part 2, and this facilitates the continuous operation of the braking part 2.

The push shaft 5 consists of a first end 51, a diameter-varying segment 53 and a second end 52, the first end 51 presses against the rim of the cam 4, the diameter-varying segment 53 is located within the fixed seat 6, and a compression spring 54 is sleeved on the second end 52 of the push shaft 5 and is located between the fixed seat 6 and the diameter-varying segment 53. The push shaft 5 converts the rotation of the cam 4 into translation, and converts the translation into the rotation of the braking part 2 through the diameter-varying segment 53, the number of parts is effectively reduced and the situation of being stuck is avoided; the compression spring 54 enables the push shaft 5 to automatically restore when it is not under stress.

The two ends of the braking part 2 are respectively a linkage end 21 and a stop end 22 located on upper and lower sides of the pin 23, the linkage end 21 presses against an outer surface of the diameter-varying segment 53, and when the push shaft 5 translates, the changing outline of the diameter-varying segment 53 pushes the linkage end 21 to move so that the stop end 22 swings around the pin 23 to clamp or leave a sidewall of the wire feeding disc 1, realizing limiting or releasing of the wire feeding disc 1. The diameter-varying segment 53 pushes the linkage end 21 to convert the translation of the push shaft 5 into the rotation of the braking part 2, the linkage end 21 and the stop end 22 are located on the two sides of the pin 23, and thus it is more labor-saving to push the linkage end 21.

The specific working process is as follows: when an operation trigger of the rebar tying machine is pulled, the wire feeding mechanism starts to feed the wire; when the feeding amount of the wire reaches a set value, the motor 3 starts and drives the cam 4 to rotate, such that the push shaft 5 moves along with the outline surface of the rim of the cam 4, pushing the braking part 2 to swing to brake the wire feeding disc 1; the cam 4 continues to rotate until the elastic piece 8 is limited by the notch 42 of the cam 4, the rotation inertia of the cam 4 is offset, so as to keep the cam 4 in the initial position waiting for the next working cycle.

Embodiment 3

Figure 7:
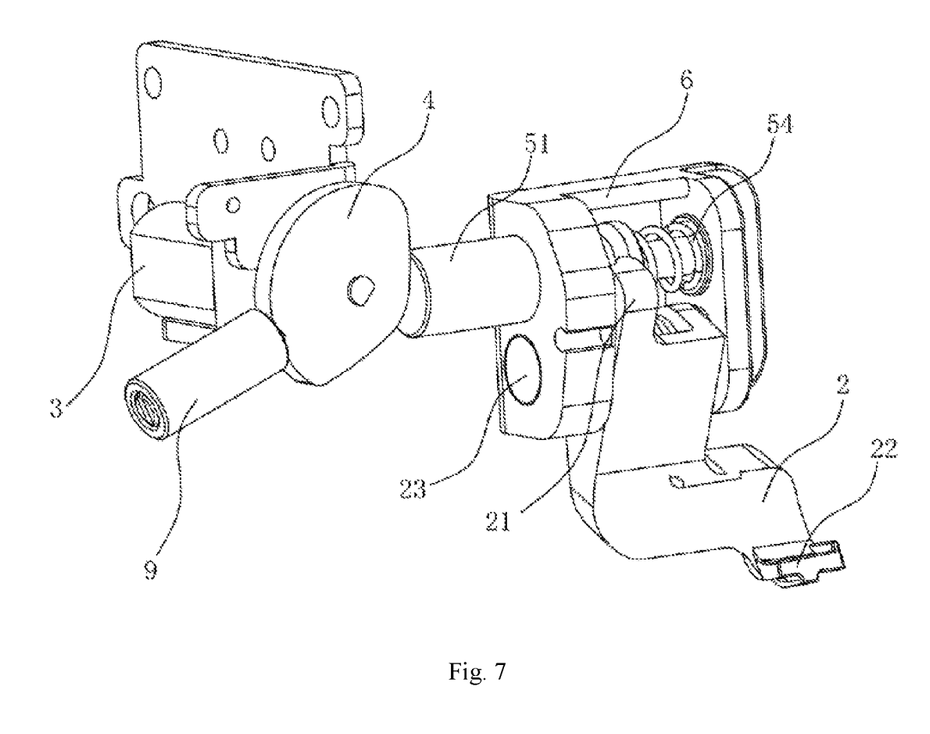
FIG. 7 illustrates a structural schematic view of a rebar tying machine wire feeding disc braking mechanism according to embodiment 3.
Figure 8:
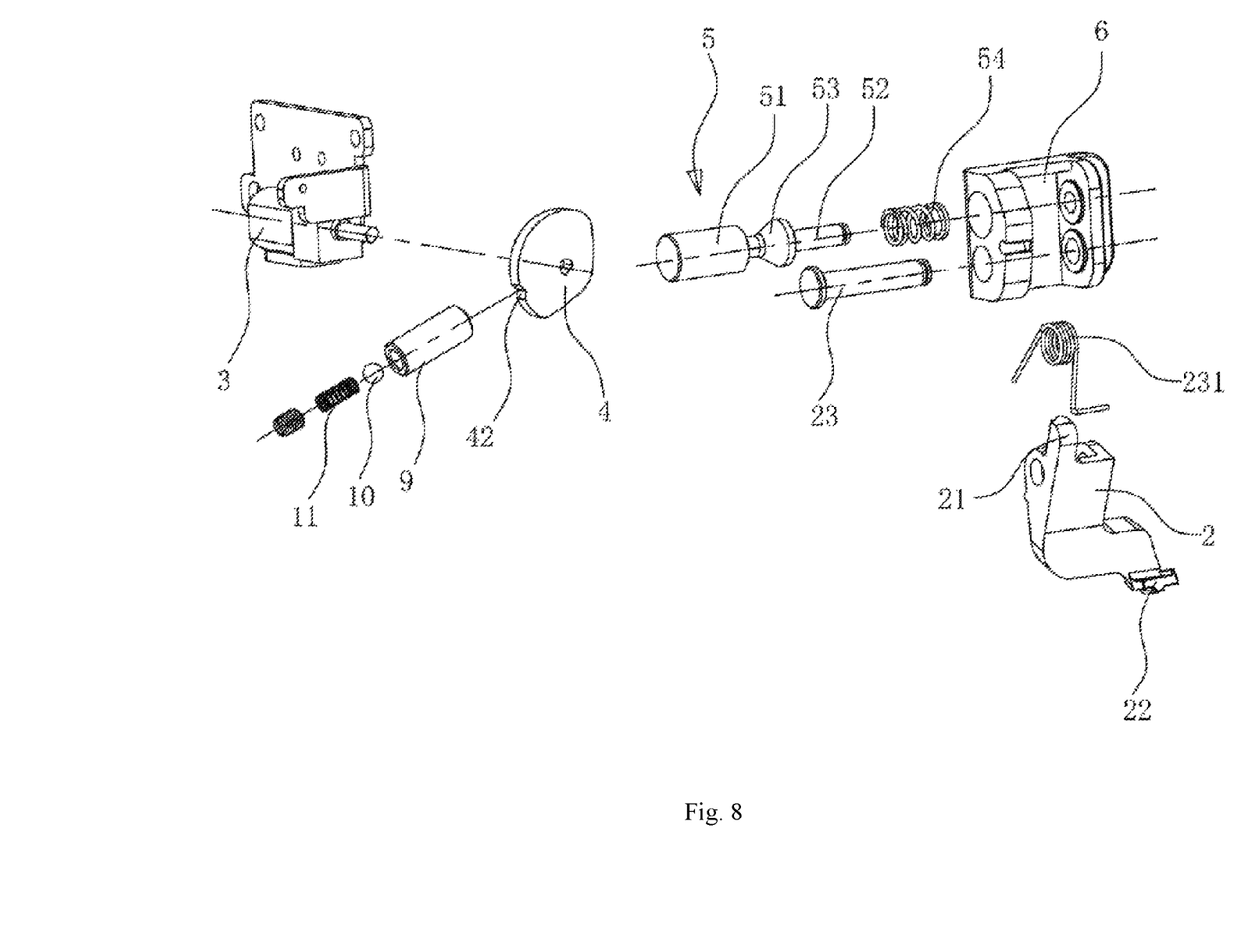
FIG. 8 illustrates an assembly structure schematic view of a rebar tying machine wire feeding disc braking mechanism according to embodiment 3.

As illustrated in FIG. 7 and FIG. 8, the present embodiment has the following differences from embodiment 2: a rebar tying machine wire feeding disc braking mechanism with a positioning device provided by the present embodiment comprises a braking part 2 for stopping a wire feeding disc 1, and further comprises a cam mechanism for controlling actions of the braking part 2, the cam mechanism comprises a cam 4 driven by a motor 3 and a push shaft 5 mounted on a fixed seat 6 and capable of axial displacement, one end of the push shaft 5 presses against a rim of the cam 4 and reciprocates along with the changing outline of the rim, the middle portion of the push shaft 5 is a diameter-varying segment 53 and presses against one end of the braking part 2 such that the braking part 2 swings forwards and backwards with the translation of the push shaft 5, the motor 3 enables the cam 4 to rotate for one turn at each time, a notch 42 is provided in the rim of the cam 4, the cam mechanism realizes stopping through a hollow pipe 9 with a built-in ball 10, one end of the hollow pipe 9 is closed, a spring 11 is provided between the ball 10 and the closed end of the hollow pipe 9, the spring 11 enables the ball 10 to be in close contact with the rim of the cam 4, and when the ball 10 is placed in the notch 42, the forward rotation inertia of the cam 4 is eliminated, and the cam 4 stops rotating and stops at the initial position.

When the cam 4 is in the initial position, the elastic part and notch 42 realize limiting; when the motor 3 starts, the elastic part moves in close contact with the rim of cam 4; when the motor 3 rotates for one turn and stops, the cam 4 still has inertia; after the ball 10 is placed in the notch 42 and eliminates the inertia of the cam 4, the cam 4 stops to ensure accurate positioning of the cam 4 and accurate braking during repetitive braking; and the positioning device is a mechanical structure and has a more stable structure relative to an electronic control part, and the braking accuracy can be better guaranteed. The ball 10 rolls along the rim of the cam 4, it is subject to small friction and low forward resistance; when the ball 10 moves to the notch 42, the motor 3 has been powered off, and the torsion force generated by the cam 4 rotating under the inertia is small, the ball 10 falls into the notch 42 to eliminate the rotation inertia of the cam 4, the motor 3 starts, the cam 4 starts to rotate again, and the cam 4 can push the ball 10 away under the torsion force, such that the it is not easily stuck.

The specific working process is as follows: when an operation trigger of the rebar tying machine is pulled, the wire feeding mechanism starts to feed the wire; when the feeding amount of the wire reaches a set value, the motor 3 starts and drives the cam 4 to rotate, such that the push shaft 5 moves along with the outline surface of of the cam 4, pushing the braking part 2 to swing to brake the wire feeding disc 1; the cam 4 continues to rotate until the ball 10 is limited by the notch 42 of the cam 4 to offset the rotation inertia of the cam 4, so as to keep the cam 4 in the initial position waiting for the next working cycle.

In the present embodiment, the adopted motor model is 12GAN20-100, the voltage is DC 12V, the current is 0.13 A, and the rotary speed of the motor is preferably 200-400 rpm, most preferably 320 rpm.

The motor is electrically connected with the Hall sensor, and the stop signal is transmitted through electric wires to guarantee rapid and accurate transmission.

The above are just the specific implementations of the present invention, but the protection scope of the present invention is not limited thereto. One skilled in the art should understand that the present invention includes, but is not limited to, the accompanying drawings and the contents described in the above specific implementations. Any modification made without deviating from the function and structural principle of the present invention shall be included in the scope of the claims.

The invention claimed is:

1. A rebar tying machine comprising a wire feeding means and a disc braking mechanism with a positioning device, comprising a braking part for stopping a wire feeding disc, wherein the rebar tying machine wire feeding disc braking mechanism with a positioning device further comprises a cam mechanism for controlling actions of the braking part, the cam mechanism comprises a cam and a push shaft mounted on a fixed seat and capable of axial displacement, one end of the push shaft presses against a rim of the cam and reciprocates along with the changing outline of the rim, a middle portion of the push shaft is a diameter-varying segment and presses against one end of the braking part such that the braking part swings forwards and backwards with the translation of the push shaft, the cam mechanism realizes stopping through the positioning device, the positioning device comprises a motor capable of forward and reverse rotation motion and a Hall sensing device for sending out a stop signal, the motor is used for controlling actions of the cam, the Hall sensing device sends out a stop signal when the cam rotates to an initial position; according to the stop signal, the motor stops and reversely rotates instantaneously to eliminate the forward rotation inertia of the cam such that the cam stops at the initial position.

2. The rebar tying machine according to claim 1, wherein the Hall sensing device comprises a magnetic part provided on the cam and a stationary Hall sensor, the magnetic part rotates with the cam, and when the cam is in the initial position, the magnetic part enables the Hall sensor to generate the stop signal.

3. The rebar tying machine according to claim 2, wherein the Hall sensor is fixed on a connecting plate and the connecting plate is fixed between the motor and the cam.

4. The rebar tying machine according to claim 1, wherein the motor is a low-power motor.

5. The rebar tying machine according to claim 1, wherein the braking part is rotatably connected to the fixed seat through a pin, a torsion spring for restoring the braking part is sleeved on the pin, and the torsion spring is limited by the fixed seat and the braking part.

6. The rebar tying machine according to claim 5, wherein the push shaft consists of a first end, a diameter-varying segment and a second end, the first end presses against the rim of the cam, the diameter-varying segment is located within the fixed seat, and a compression spring is sleeved on the second end of the push shaft and is located between the fixed seat and the diameter-varying segment.

7. The rebar tying machine according to claim 5, wherein the two ends of the braking part are respectively a linkage end and a stop end located on upper and lower sides of the pin, the linkage end presses against an outer surface of the diameter-varying segment, and when the push shaft translates, the changing outline of the diameter-varying segment pushes the linkage end to move so that the stop end swings around the pin to clamp or leave a sidewall of the wire feeding disc, realizing limiting or releasing of the wire feeding disc.

8. A rebar tying machine comprising a wire feeding means and a disc braking mechanism with a positioning device, comprising a braking part for stopping a wire feeding disc, wherein the rebar tying machine wire feeding disc braking mechanism with a positioning device further comprises a cam mechanism for controlling actions of the braking part, the cam mechanism comprises a cam driven by a motor and a push shaft mounted on a fixed seat and capable of axial displacement, one end of the push shaft presses against a rim of the cam and reciprocates along with the changing outline of the rim, a middle portion of the push shaft is a diameter-varying segment and presses against one end of the braking part such that the braking part swings forwards and backwards with the translation of the push shaft, the motor enables the cam to rotate for one turn at each time, the cam mechanism realizes stopping through the positioning device, the positioning device is an elastic part in close contact with the rim of the cam, a notch is provided in the rim of the cam, the elastic part and the notch realize limiting to eliminate the forward rotation inertia of the cam such that the cam stops at an initial position.

9. The rebar tying machine according to claim 8, wherein the elastic part is an elastic piece, one end of the elastic piece is fixed, the other end is bent to form a bulge, the bulge is capable of sliding in close contact with the rim of the cam, and when the bulge is located in the notch, the cam stops rotating.

10. The rebar tying machine according to claim 8, wherein the elastic part is a hollow pipe with a built-in ball, one end of the hollow pipe is closed, a spring is provided between the ball and the closed end of the hollow pipe, the spring enables the ball to be in close contact with the rim of the cam, and when the ball is placed in the notch, the cam stops rotating.

* * * * *